United States Patent Office 3,532,676
Patented Oct. 6, 1970

3,532,676
POLYMETHYLENE SULFIDE PREPARATION
Nathaniel L. Remes, Yonkers, N.Y., and Jesse C. H. Hwa,
Stamford, Conn., assignors to Stauffer Chemical Company, New York, N.Y., a corporation of Delaware
No Drawing. Original application Sept. 23, 1965, Ser. No.
489,762. Divided and this application Feb. 27, 1967,
Ser. No. 635,632
Int. Cl. C08g 23/00
U.S. Cl. 260—79
8 Claims

ABSTRACT OF THE DISCLOSURE

A process for the preparation of polymethylene sulfide $(-CH_2-S-)_n$ is provided through the reaction of a salt of trithiocarbonic acid (M—S—C(S)S—M) and formaldehyde (HCHO). Preferred salts of trithiocarbonic acid include the sodium and ammonium salts. Preferred temperatures are from about 40° C. to about 80° C.

---

This application is a division of application Ser. No. 489,762, filed Sept. 23, 1965.

This invention relates to polymethylene sulfide and in particular to a new and novel process of preparing same.

Polymethylene sulfide is a collective term for a class of known polymeric materials made up of recurring —($CH_2S$)— units. The molecular weight and properties of a particular specimen usually vary with its mode of preparation. One common method of preparing polymethylene sulfide consists of reacting sodium sulfide with bis(chloromethyl)sulfide in aqueous alcohol as disclosed by Lal in J. Org. Chem., 26, 971 (1961). Another process for producing polymethylene sulfide is based on the polymerization of s-trithiane (thioformaldehyde trimer). Still another procedure calls for the reaction of formaldehyde with alkali metal sulfides under strongly basic conditions. A further known process consists of reacting formaldehyde with hydrogen sulfide in the presence of catalytic amounts of sodium hydrosulfide. Other methods are also known but these are usually similar to the aforedescribed procedures.

It has now been discovered that polymethylene sulfide of excellent quality and in high yields can be realized by reacting a methylene derivative with a salt of trithiocarbonic acid under relatively mild reaction conditions and isolating the soformed polymethylene sulfide and the provision of such a process constitutes the principal object and purpose of the present invention. Other objects and purposes will become manifest subsequently.

In carrying out the process of our invention, we have achieved especially satisfactory results by contacting the methylene derivative with an aqueous solution or suspension of a salt of trithiocarbonic acid. In the case of methylene derivatives which are immiscible with an aqueous solution of the trithiocarbonate salt, a dispersing or surface active agent may be utilized to provide better contact between phases.

The reaction may also be carried out in the presence of a solvent or diluent which is miscible or partially miscible with one of the components and does not react with the reagents of the invention. Suitable, but nonlimiting examples of solvents include cyclic ethers such as dioxane and tetrahydrofuran, the lower saturated aliphatic alcohols, e.g., methyl alcohol, ethyl alcohol, isopropyl alcohol, isobutyl alcohol, etc., the lower aliphatic saturated ketones, e.g., acetone, methylethylketone, diethylketone, etc., the partially etherfied polyols, e.g., ethylene glycol monomethyl ether, propylene glycol monomethyl ether, ethylene glycol monoethyl ether, relatively neutral nitrogenous solvents such as formamide and dimethylacetamide and, in general, any of the normally liquid, relatively inert organic solvents having an appreciable degree of water solubility. The reaction is preferably conducted in the range of about room temperature to moderately elevated temperatures. A convenient procedure consists in selecting a solvent media having a moderate boiling point and heating the components therein under reflux.

By methylene derivative is meant a di-substituted compound of the following formula:

wherein X and X' each may be halogen, e.g., chloride, bromide, iodide; an organic acid radical, e.g., fatty acid radical such as acetate, benzoate, naphthoate, etc. The methylene derivative may also be formaldehyde, in which case X and X' taken collectively represent an oxygen radical of the formula =O. Examples of methylene derivatives particularly suitable and convenient for practicing the invention are formaldehyde and the methylene halides, preferably methylene chloride.

Suitable salts of trithiocarbonic acid include the alkali metal trithiocarbonates, e.g., lithium trithiocarbonate, sodium trithiocarbonate, potassium trithiocarbonate, and ammonium trithiocarbonate, and the alkaline earth metal trithiocarbonates, e.g., calcium trithiocarbonate, barium trithiocarbonate, strontium trithiocarbonate, magnesium trithiocarbonate, and the like. As a matter of convenience, water-soluble salts such as sodium trithiocarbonate are preferred.

The reaction of the trithiocarbonate salts with the methylene derivative is exemplified by the following equations:

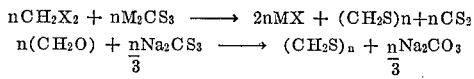

The reactants may be employed according to the above stoichiometry, or an excess of one of the reactants may be employed. A particular feature of our process is that the comcentration of the reactants may be varied over wide limits. Thus, we have achieved excellent yields of high quality polymer using aqueous formaldehyde in which the concentration of formaldehyde varies from about 10% to about 60% by weight.

The formaldehyde may be derived from one of its precursors such as paraformaldehyde, trioxane, formalin, dimethyl acetal, and the like. Alternatively, pure gaseous formaldehyde can be introduced directly into the reaction mixture. The concentration of the alkali metal trithiocarbonate may also be varied over wide limits and may be used in excess if desired. We have operated with solutions of sodium trithiocarbonate varying in concentration from about 10% to 70% by weight without significant changes in the yield or quality of product.

Moderately elevated temperatures are preferred, and in this connection a temperature range of from about 40° C. to about 80° C. when operating at atmospheric pressure is advocated. If resort is had to higher temperatures, then the reaction system must be pressurized to retain volatile components and solvents. The polymethylene sulfide separates from the reaction mixture as an insoluble precipitate which can be isolated by filtration and freed of salts by washing with water.

THE PREPARATION OF SODIUM TRITHIOCARBONATE

Sodium sulfide nonahydrate, 480 g. (2 moles) was dissolved in 500 ml. of water in a flask equipped with stirrer, dropping funnel, thermometer and reflux condenser.

The temperature was raised to 40° C., and carbon disulfide, 167 g. (2.2 moles) was added dropwise over a 40-minute period. The reaction was stirred at room temperature for 18 hours. During this period, the bulk of the carbon disulfide had dissolved to form a bright orange solution. The unreacted carbon disulfide (ca. 5 ml.) was separated and the solution diluted to 2000 ml., to produce a solution that was approximately 1-molar with respect to sodium trithiocarbonate.

Similarly, by using less water, a stock sodium trithiocarbonate solution was prepared which was 2-molar with respect to the salt.

THE PREPARATION OF LITHIUM TRITHIOCARBONATE

Lithium hydroxide, 168 g. (4.0 moles) was suspended in 500 ml. of ethanol in a flask equipped with stirrer, condenser and gas inlet tube. Hydrogen sulfide, 68 g. (2.0 moles) was passed into the solution over a 3-hour period. The temperature rose during the addition from 30 to 45° C., and precipitate formed. Carbon disulfide, 152 g. (2 moles) was added dropwise over an 80-minute period during which time it dissolved while the reaction mixture became bright red, characteristic of a trithiocarbonate. The product was clarified by filtration, leaving 7.3 g. of insolubles. The filtrate was diluted to 1000 ml. with ethanol, to produce a solution which is approximately 2-molar with respect to lithium trithiocarbonate. The ultra violet light absorption curves corresponded to that reported by Ingram and Toms, J. Chem. Soc. (1957), 4328.

The following non-limiting examples illustrate the manner of practicing the invention.

EXAMPLE 1

Two hundred ml. of 2-molar sodium trithiocarbonate (ca. 0.4 mole of $Na_2CS_3$), which had been prepared by the above described procedure, was added to 34 g. (0.4 mole) of methylene chloride in a 3-necked flask equipped with stirrer, condenser and a thermometer to register the temperature of the reactants. The reactants were heated under gentle reflux at a temperature of approximately 40° C. for 8 hours. During this period, the solution became murky and a small quantity of solid separated. After 17 hours, a water collector was added, and the volatiles distilled off, yielding 12.12 g. of carbon disulfide. The residue when filtered yielded 28.0 g. of a yellow powder. A 10-g. aliquot when washed with water produced 5.6 g. of a white powder, which melted at 240–248° C. By elemental analysis, the product was found to contain 60.8% sulfur, 28.50% carbon, 5.37% hydrogen, and 7.47% ash. The infrared spectrum of the product corresponded to that of polymethylene sulfide, as prepared by the method of Lal, J. Org. Chem., 26,971 (1961).

EXAMPLE 2

To 200 ml. of a 2.0 molar solution of sodium trithiocarbonate (ca. 0.4 mole of $Na_2CS_3$) prepared as in Example 1, contained in a 3-necked flask equipped with stirrer, condenser and thermometer, was added 32.5 g. of an aqueous solution of 37% formaldehyde (0.4 mole as formaldehyde). The reaction mixture was heated for 7 hours at about 70° C. The precipitate which separated was filtered and washed with dilute hydrochloric acid, leaving a white solid which weighed 13.0 g. after drying to constant weight. The product melted at 222–224° C. and its infra red spectrum corresponded to that of polymethylene sulfide, as prepared by the method of Lal, J. Org. Chem., 26,971 (1961).

Using the procedure of the previous examples, the following preparations of polymethylene sulfide were carried out:

PREPARATION OF POLYMETHYLENE SULFIDE BY THE REACTION OF METHYLENE HALIDES WITH ALKALI TRITHIOCARBONATES

| Example | Reactant (Moles) | | Conditions | | | Yield (g.) | M.P. (° C.) |
|---|---|---|---|---|---|---|---|
| | $CH_2Cl_2$ | $Na_2CS_3$ [a] | Temp. (° C.) | Time (hrs.) | Solvent | | |
| 3 | 0.4 | [b] 0.2 | 50–70 | 6.75 | $C_2H_5OH$ | 30 | 188–91 |
| 4 | 0.4 | 0.2 | 70 | 4 | $C_2H_5OH$ | 41 | 182–89 |
| 5 | [c] 0.2 | 0.2 | 40–50 | 11 | $H_2O$ [c] | 9.2 | |
| 6 | 0.4 | 0.4 | 40–50 | 8 | $H_2O$ | 15.5 | 227–30 |
| 7 | 0.4 | 0.4 | 40–50 | 17 | $H_2O$ | 15.7 | 240–48 |
| 8 | 0.2 | 0.2 | 31 | 17 | $CS_2$ | 5.8 | 240–45 |
| 9 | 0.2 | 0.4 | 40–50 | 17 | $H_2O$ | 7.7 | 220–25 |
| 10 | 0.4 | 0.4 | 40–50 | 17 | $H_2O$ [d] | 10.5 | 230–23 |

[a] The concentration of alkali-metal trithiocarbonate was 2.0 molar.
[b] $Li_2CS_3$.
[c] $CH_2Br_2$.
[d] Reaction conducted in presence of 5.9 g. of hexadecyltrimethylammonium chloride.

PREPARATION OF POLYMETHYLENE SULFIDE BY THE REACTION OF FORMALDEHYDE WITH SODIUM TRITHIOCARBONATE

| Example | Moles | | Conditions | | Yield (percent) | M.P. (° C.) |
|---|---|---|---|---|---|---|
| | $CH_2O$ | $Na_2CS_3$ | Time (hrs.) | Temp. (° C.) | | |
| 11 | 0.3 | 0.4 | 6 | 55–72 | 74 | 200–204 |
| 12 | 6.0 | 6.0 | 10 | 63–75 | 80 | 215–217 |
| 13 | 0.6 | 0.2 | 7 | 60–70 | 71 | |

We claim:

1. The process of preparing polymethylene sulfide which comprises reacting a salt of trithiocarbonic acid selected from the group consisting of alkali metal trithiocarbonates, alkaline earth metal trithiocarbonates and ammonium trithiocarbonates with a methylene derivative selected from the class conisting of formaldehyde, paraformaldehyde, trioxane, formaline or dimethyl acetal.

2. The process according to claim 1 wherein the reaction is carried out in the presence of a normally liquid aqueous medium.

3. The process according to claim 1 wherein the process is carried out under moderately elevated temperatures.

4. The process according to claim 1 wherein the trithiocarbonate salt is an alkali metal salt.

5. The process according to claim 4 wherein the alkali metal salt is sodium trithiocarbonate.

6. The process according to claim 1 wherein the methylene derivative is formaldehyde.

7. The process of preparing polymethylene sulfide comprising reacting in an aqueous medium sodium trithiocarbonate and formaldehyde at moderately elevated temperatures.

8. The process of preparing polymethylene sulfide comprising reacting in aqueous media about 1 mole of sodium trithiocarbonate and from about 0.75 mole to about 3 moles of formaldehyde at a temperature of from about 40° C. to about 80° C. separating the resulting polymethylene sulfide, acidifying same with aqueous hydrochloric acid, washing to remove the acid and isolating the washed polymethylene sulfide.

References Cited

UNITED STATES PATENTS 3,331,817   7/1967   Liggett et al. _____ 260—79

DONALD E. CZAJA, Primary Examiner

M. I. MARQUIS, Assistant Examiner

UNITED STATES PATENT OFFICE
CERTIFICATE OF CORRECTION

Patent No. 3,532,676      Dated October 6, 1970

Inventor(s) Nathaniel L. Remes and Jesse C. H. Hwa

It is certified that error appears in the above-identified patent and that said Letters Patent are hereby corrected as shown below:

Column 2, line 43 - "concentration" is misspelled

Column 4, in the first table listed, opposite Example 4, under "M.P. (°C.)" - "182-89" should read --182-86--;
    same table, opposite Example 6, under "Time (hrs.)" - "8" should read --18--;
    same table, opposite Example 10, under "M.P.(°C.)" - "230-23" should read --230-235--

SIGNED AND
SEALED
DEC 29 1970

(SEAL)
Attest:

Edward M. Fletcher, Jr.
Attesting Officer

WILLIAM E. SCHUYLER, JR.
Commissioner of Patents